US010100657B2

(12) United States Patent
Chuong

(10) Patent No.: US 10,100,657 B2
(45) Date of Patent: Oct. 16, 2018

(54) NON-CONTACT SEAL WITH MONOLITHIC/UNITARY CARRIER STRUCTURE

(71) Applicant: United Technologies Corporation, Farmington, CT (US)

(72) Inventor: Conway Chuong, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 13 days.

(21) Appl. No.: 15/236,855

(22) Filed: Aug. 15, 2016

(65) Prior Publication Data
US 2018/0045067 A1 Feb. 15, 2018

(51) Int. Cl.
F16J 15/06 (2006.01)
F01D 11/04 (2006.01)
F16J 15/40 (2006.01)
F16J 15/3268 (2016.01)
F01D 5/02 (2006.01)
F01D 25/16 (2006.01)
F01D 25/24 (2006.01)

(52) U.S. Cl.
CPC ............... *F01D 11/04* (2013.01); *F01D 5/02* (2013.01); *F01D 25/162* (2013.01); *F01D 25/24* (2013.01); *F16J 15/3268* (2013.01); *F16J 15/40* (2013.01); *F05D 2220/323* (2013.01)

(58) Field of Classification Search
CPC .......... F01D 11/04; F01D 5/02; F01D 25/162; F01D 25/24; F16J 15/3268; F16J 15/40
See application file for complete search history.

(56) References Cited

U.S. PATENT DOCUMENTS

| 6,145,844 | A | * | 11/2000 | Waggott | ............... | F01D 11/025 |
|---|---|---|---|---|---|---|
| | | | | | | 277/412 |
| 8,172,232 | B2 | | 5/2012 | Justak | | |
| 8,641,045 | B2 | | 2/2014 | Justak | | |
| 8,919,781 | B2 | | 12/2014 | Justak | | |
| 2015/0322816 | A1 | | 11/2015 | Schmitz | | |
| 2016/0097294 | A1 | * | 4/2016 | Wilson | ................. | F01D 11/001 |
| | | | | | | 415/173.1 |

(Continued)

FOREIGN PATENT DOCUMENTS

| CA | 2403664 | 7/2007 |
|---|---|---|
| CA | 2536362 | 2/2013 |

(Continued)

OTHER PUBLICATIONS

EP search report for EP17175799.0 dated Dec. 13, 2017.

*Primary Examiner* — Gilbert Y Lee
(74) *Attorney, Agent, or Firm* — O'Shea Getz P.C.

(57) ABSTRACT

An assembly includes a monolithic carrier structure and a seal assembly. The monolithic carrier structure includes a carrier base and a support ring. The carrier base extends axially along the centerline. The support ring projects radially inward from the carrier base. The seal assembly is nested radially within the carrier base and axially next to the support ring. The seal assembly includes a seal base, a plurality of spring elements and a plurality of seal shoes arranged about the centerline in an annular array. The seal base circumscribes the annular array of the seal shoes. Each of the spring elements is radially between and connects a respective one of the seal shoes with the seal base.

13 Claims, 9 Drawing Sheets

(56) References Cited

U.S. PATENT DOCUMENTS

2016/0102570 A1  4/2016  Wilson et al.
2016/0109025 A1  4/2016  McCaffrey et al.

FOREIGN PATENT DOCUMENTS

| CA | 2675597 | 5/2015 |
| EP | 2279364 | 5/2009 |
| EP | 2665897 | 11/2013 |
| EP | 2137383 | 12/2013 |
| WO | 2014150825 | 9/2014 |

* cited by examiner

NON-CONTACT SEAL WITH MONOLITHIC/UNITARY CARRIER STRUCTURE

This invention was made with government support under Contract No. FA8650-09-D-2923-0021 awarded by the United States Air Force. The government may have certain rights in the invention.

BACKGROUND OF THE INVENTION

1. Technical Field

This disclosure relates generally to rotational equipment and, more particularly, to a non-contact seal assembly for rotational equipment.

2. Background Information

Various hydrostatic non-contact seal assemblies are known in the art. While these seal assemblies have various benefits, there is still room in the art for improvement.

SUMMARY OF THE DISCLOSURE

According to an aspect of the present disclosure, an assembly is provided for rotational equipment with an axial centerline. This assembly includes a monolithic carrier structure including a carrier base and a support ring. The carrier base extends axially along the centerline. The support ring projects radially inward from the carrier base. The assembly also includes a seal assembly nested radially within the carrier base and axially next to the support ring. The seal assembly includes a seal base, a plurality of spring elements and a plurality of seal shoes arranged about the centerline in an annular array. The seal base circumscribes the annular array of the seal shoes. Each of the spring elements is radially between and connects a respective one of the seal shoes with the seal base.

According to another aspect of the present disclosure, an assembly is provided for a gas turbine engine with an axial centerline. This assembly includes a turbine engine static structure, a turbine engine rotor structure, a carrier structure and a seal assembly. The carrier structure includes a tubular carrier base and an annular support ring which is formed integral with the carrier base as a unitary body. The carrier base is mounted to and radially within the static structure. The seal assembly is nested radially within the carrier base and axially next to the support ring. The seal assembly is configured to substantially seal an annular gap between the static structure and the rotor structure. The seal assembly includes a seal base, a plurality of spring elements and a plurality of seal shoes arranged about the centerline in an annular array. The seal shoes circumscribe and sealingly engage the rotor structure. The seal base circumscribes the annular array of the seal shoes and radially contacts the carrier base. Each of the spring elements is radially between and connects a respective one of the seal shoes with the seal base.

According to still another aspect of the present disclosure, an assembly is provided with an axial centerline. This assembly includes a static structure, a rotor structure, a monolithic carrier structure and a seal assembly. The monolithic carrier structure includes a tubular carrier base and an annular support ring. The carrier base is mounted to and radially within the static structure. The seal assembly is configured as or otherwise includes a hydrostatic non-contact seal device nested radially within the carrier base and axially besides the support ring. The seal assembly is configured to provide a seal between the static structure and the rotor structure.

The hydrostatic non-contact seal device may include a seal base, a plurality of spring elements and a plurality of seal shoes arranged about the centerline in an annular array. The seal shoes may circumscribe and sealingly engage the rotor structure. The seal base may circumscribe the seal shoes and radially engage the carrier base. Each of the spring elements may be radially between and connect a respective one of the seal shoes with the seal base.

The spring elements may be formed integral with the seal base and the seal shoes as a unitary body.

The seal base may radially engage the carrier base and axially engage the support ring.

The support ring may radially overlap and may be configured to provide an axial support for the spring elements.

The assembly may be configured such that: (A) a gap extends axially between the support ring and a first of the spring elements during a first mode; and (B) the first of the spring elements axially engages the support ring during a second mode.

The support ring may be a scalloped support ring.

The support ring may be configured with a plurality of apertures arranged about the centerline in an annular array. Each of the apertures may extend, in a radial outward direction, partially into the support ring.

The assembly may include a secondary seal carrier ring and at least one secondary seal device. The secondary seal carrier ring may be nested radially within the carrier base. The secondary seal device may be configured with the secondary seal carrier ring. The secondary seal device may be configured to substantially seal an annular gap between the secondary seal carrier ring and the annular array of the seal shoes. The seal base may be engaged axially with and between the secondary seal carrier ring and the support ring.

The assembly may include a second support ring nested radially within the carrier base. The secondary seal device may be mounted axially between the secondary seal device and the second support ring.

The assembly may include a secondary seal carrier ring and at least one secondary seal device. The secondary seal carrier ring may be nested radially within the carrier base. The secondary seal device may be configured with the secondary seal carrier ring. The secondary seal device may be configured to substantially seal an annular gap between the secondary seal carrier ring and the annular array of the seal shoes. The secondary seal carrier ring may be engaged axially with and between the seal base and the support ring.

The assembly may include a static structure and a rotor structure. The seal assembly may be configured to substantially seal an annular gap between the static structure and the rotor structure. The seal shoes may circumscribe and sealingly engage the rotor structure. The carrier structure may be mounted to and radially within the static structure.

The seal assembly may be configured as or otherwise include a hydrostatic non-contact seal device which includes the seal base, the spring elements and the seal shoes.

The static structure may be configured as or otherwise include a turbine engine static structure. The rotor structure may be configured as or otherwise include a turbine engine shaft.

The rotational equipment may be configured as or otherwise include a gas turbine engine for an aircraft propulsion system.

The foregoing features and the operation of the invention will become more apparent in light of the following description and the accompanying drawings.

DETAILED DESCRIPTION OF THE INVENTION

Figure 1:
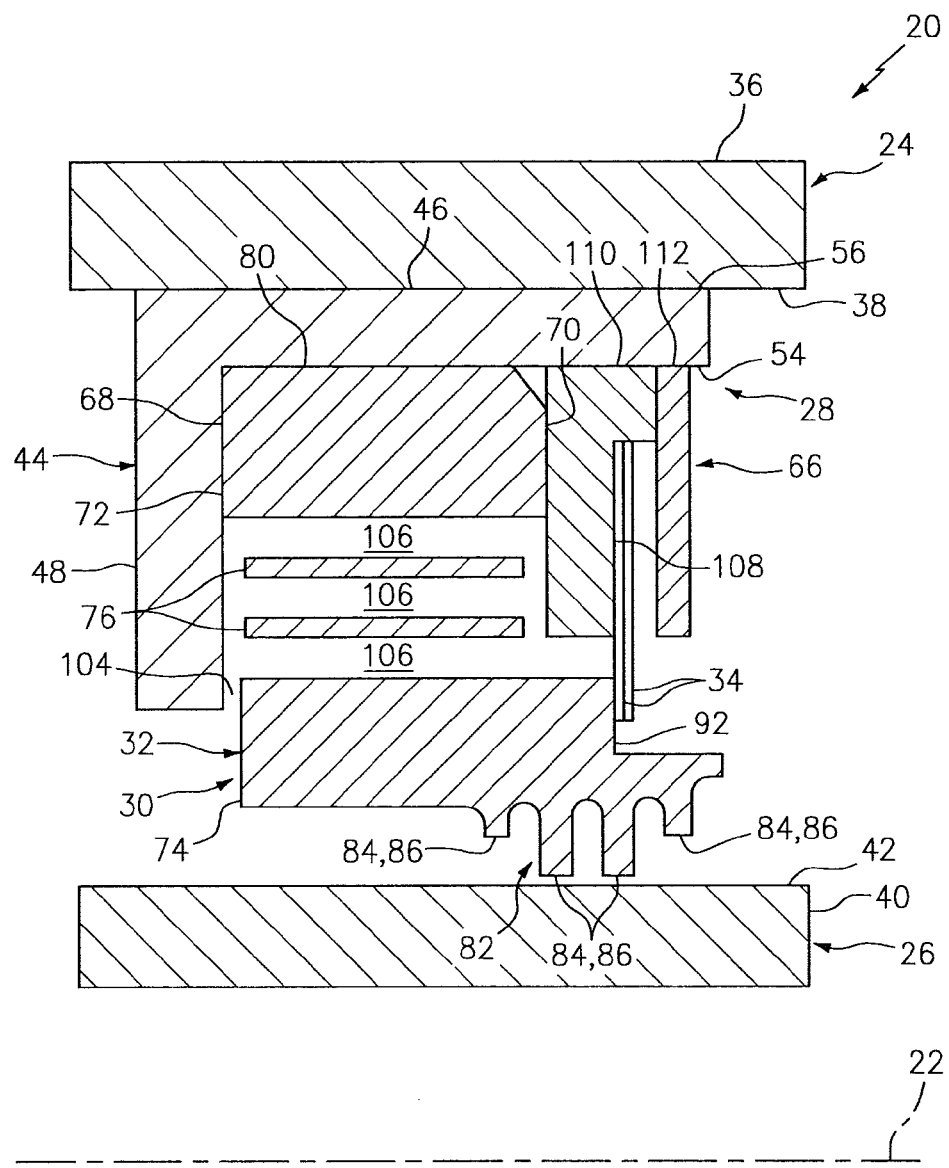
FIG. 1 is a top-half side sectional illustration of an assembly for rotational equipment.

FIG. 1 illustrates an assembly 20 for rotational equipment with an axial centerline 22. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a static structure and a rotor structure.

The assembly 20 of FIG. 1 includes a static structure 24, a rotor structure 26, a seal support assembly 28 and a seal assembly 30. The seal assembly 30 is fixedly mounted with the static structure 24 through the support assembly 28. The seal assembly 30 includes a primary seal device 32 and one or more secondary seal devices 34, which seal devices are configured to substantially seal an annular gap between the static structure 24/carrier structure 44 and the rotor structure 26 as described below in further detail.

The static structure 24 includes a static mount 36. This static mount 36 may be a discrete, unitary annular body. Alternatively, the static mount 36 may be configured with another component/portion of the static structure 24. The static mount 36 has an inner radial mount surface 38. This mount surface 38 may be substantially cylindrical, and extends circumferentially around and faces towards the axial centerline 22. The mount surface 38 at least partially forms a bore in the static structure 24. This bore is sized to receive the seal support assembly 28, components of which may be fixedly attached to the static mount 36 by, for example, a press fit connection between each component and the mount surface 38. Of course, the present disclosure is not limited to such an exemplary mounting scheme between the seal support assembly components and the static mount 36.

The rotor structure 26 includes a seal land 40. This seal land 40 may be a discrete, unitary annular body. Alternatively, the seal land 40 may be configured with another component/portion of the rotor structure 26. The seal land 40 has an outer radial seal land surface 42. This seal land surface 42 may be substantially cylindrical, and extends circumferentially around and faces away from the axial centerline 22. The seal land surface 42 is disposed to face towards and is axially aligned with the mount surface 38. While FIG. 1 illustrates the surfaces 38 and 42 with approximately equal axial lengths along the axial centerline 22, the seal land surface 42 may alternatively be longer or shorter than the mount surface 38 in other embodiments.

Figure 2:
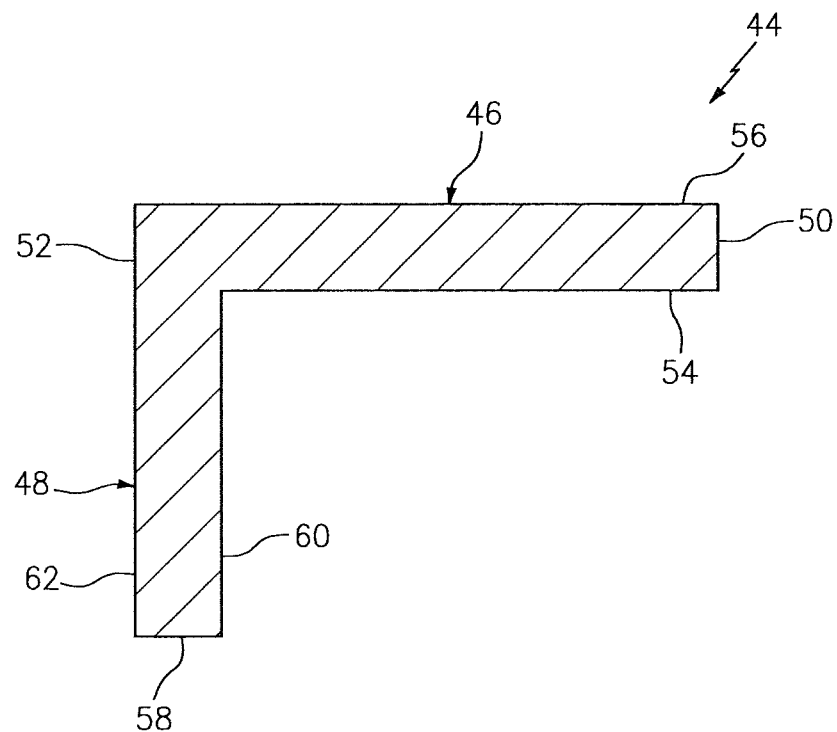
FIG. 2 is a top-half side sectional illustration of a carrier structure for the assembly of FIG. 1.
Figure 2:

The seal support assembly 28 of FIG. 1 includes a carrier structure 44, which includes a (e.g., tubular) carrier base 46 and a (e.g., annular) support ring 48. Referring to FIG. 2, the carrier structure 44 may be configured as a monolithic carrier structure. Herein, the term "monolithic" may describe a component which is formed as a single unitary body. The carrier base 46, for example, may be cast, machined, additively manufactured and/or otherwise formed integral with the support ring 48 as a unitary body. This monolithic carrier structure 44 of FIG. 2 has a full hoop body, which is formed without any mechanically interconnected axial and/or circumferential segments. The present disclosure, of course, is not limited to the foregoing exemplary carrier structure 44 configuration.

Figure 3:
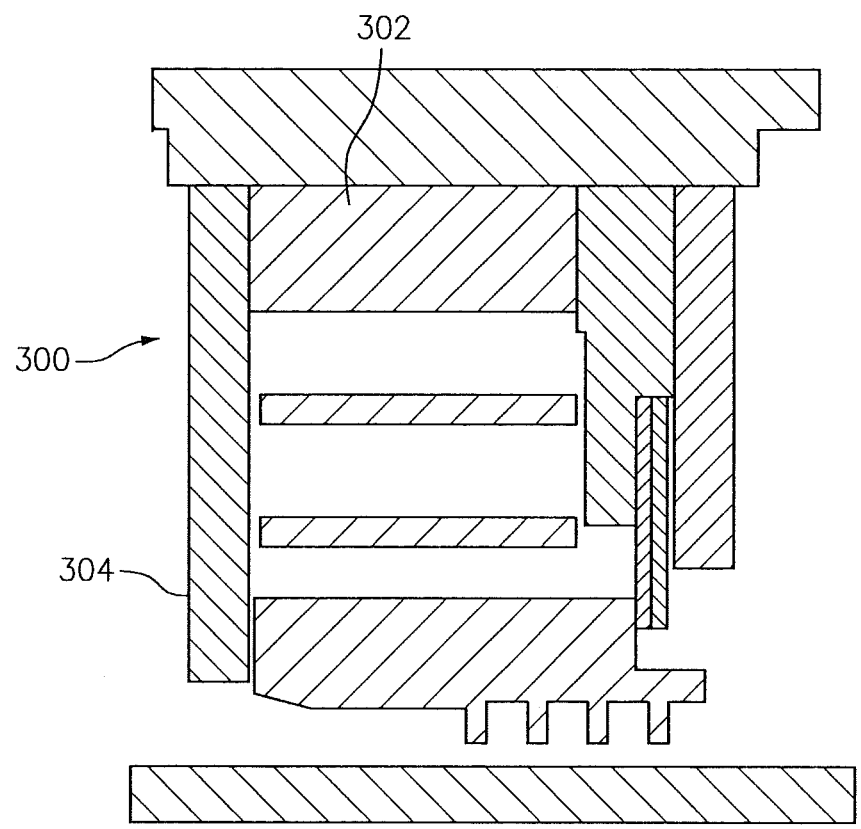
FIG. 3 is a top-half side sectional illustration of an alternative assembly.

FIG. 3 illustrates an alternative carrier structure 300 with discretely formed components. In contrast to the monolithic carrier structure 44 of FIG. 2, the carrier structure 300 of FIG. 3 includes a carrier base 302 and a discretely formed support ring 304 which must be connected to the carrier base 302. The connection between the carrier structure components 302 and 304 may be a welded connection, a mechanical snap connection or a mechanical threaded connection. Such exemplary connections, however, may be difficult to implement (particularly with hard to weld super-alloy materials) and/or require additional material to accommodate a threaded interface, etc. Such inter-carrier structure connections, however, can be avoided and are not required using the monolithic, unitary body carrier structure 44 configuration described above with respect to FIG. 2.

Referring again to the carrier structure 44 of FIG. 2, the carrier base 46 extends axially along the centerline 22 between a first end 50 and a second end 52. The carrier base 46 extends radially between an inner surface 54 and an outer surface 56, which is configured to radially engage the mount surface 38 as shown in FIG. 1.

Referring again to FIG. 2, the support ring 48 is located at (e.g., on, adjacent or proximate) the second end 52. The support ring 48 projects radially inward from the carrier base 46 and, more particularly, the inner surface 54 to a radial inner distal end 58. The support ring 48 extends axially along the centerline 22 between a first side 60 and a second side 62, which is axially aligned with the second end 52 in the embodiment of FIG. 2.

Figure 4:
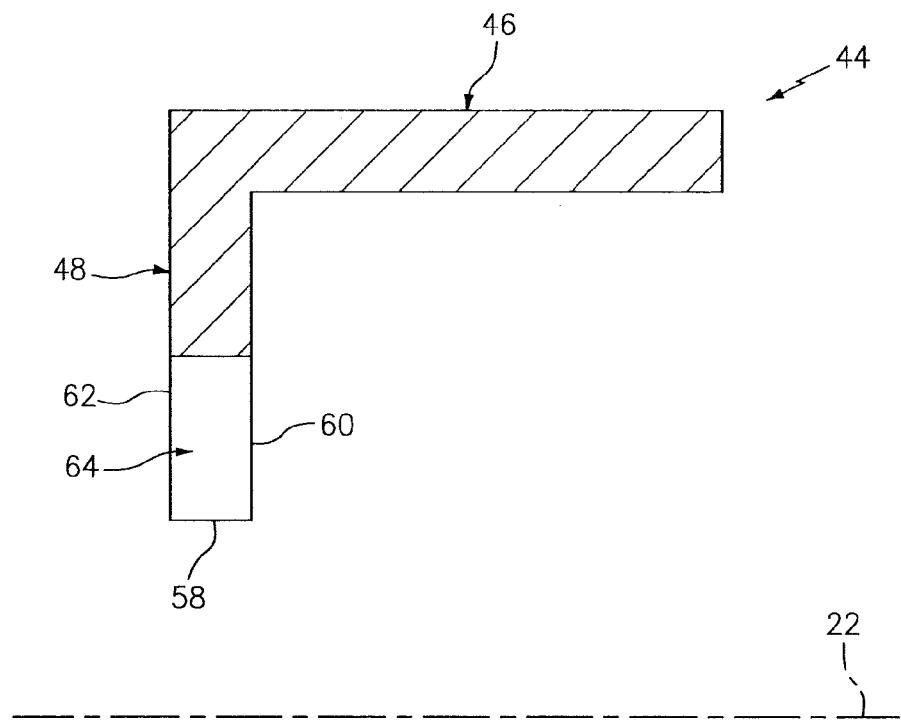
FIG. 4 is another top-half side sectional illustration of the carrier structure of FIG. 2.
Figure 5:
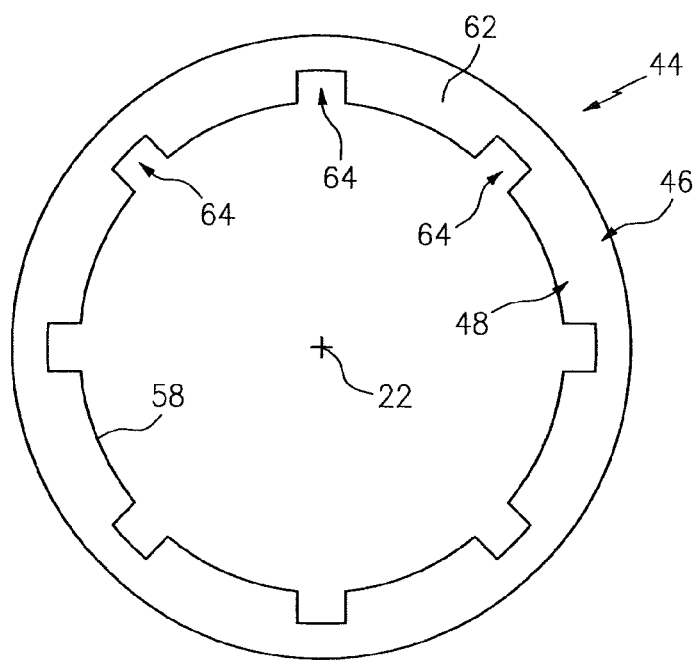
FIG. 5 is an end-view illustration of the carrier structure of FIG. 2.

The support ring 48 may be configured as a scalloped support ring as shown in FIGS. 4 and 5. For example, the support ring 48 of FIGS. 4 and 5 is configured with a plurality of apertures 64, which are arranged in an annular array about the centerline 22. Each of these apertures 64 extends axially through the support ring 48 between the first side 60 and the second side 62. Each of the apertures 64 extends, in a radial outward direction, partially into the support ring 48 from the radial inner distal end 58.

Referring to FIG. 1, the seal support assembly 28 also includes a secondary support structure 66, the configuration of which is described below in further detail. The seal support assembly components 44 and 66 are configured together to position, support and/or mount the seal devices 32 and 34 of the seal assembly 30 with the static structure 24. The carrier base 46 of FIG. 1, for example, is configured as a carrier for the assembly components 32, 34 and 66. This enables the components 32, 34, 44 and 66 to be mated with the static structure 24 as a modular unit/cartridge. The support ring 48 of FIG. 1 is configured for axial positioning and/or supporting a second end surface 68 of the primary seal device 32 relative to the static structure 24. The secondary support structure 66 of FIG. 1 is configured for positioning, supporting and/or mounting the secondary seal devices 34 relative to the primary seal device 32. This secondary support structure 66 is also configured for axial positioning and/or supporting a first end surface 70 of the primary seal device 32 relative to the static structure 24.

Figure 6:
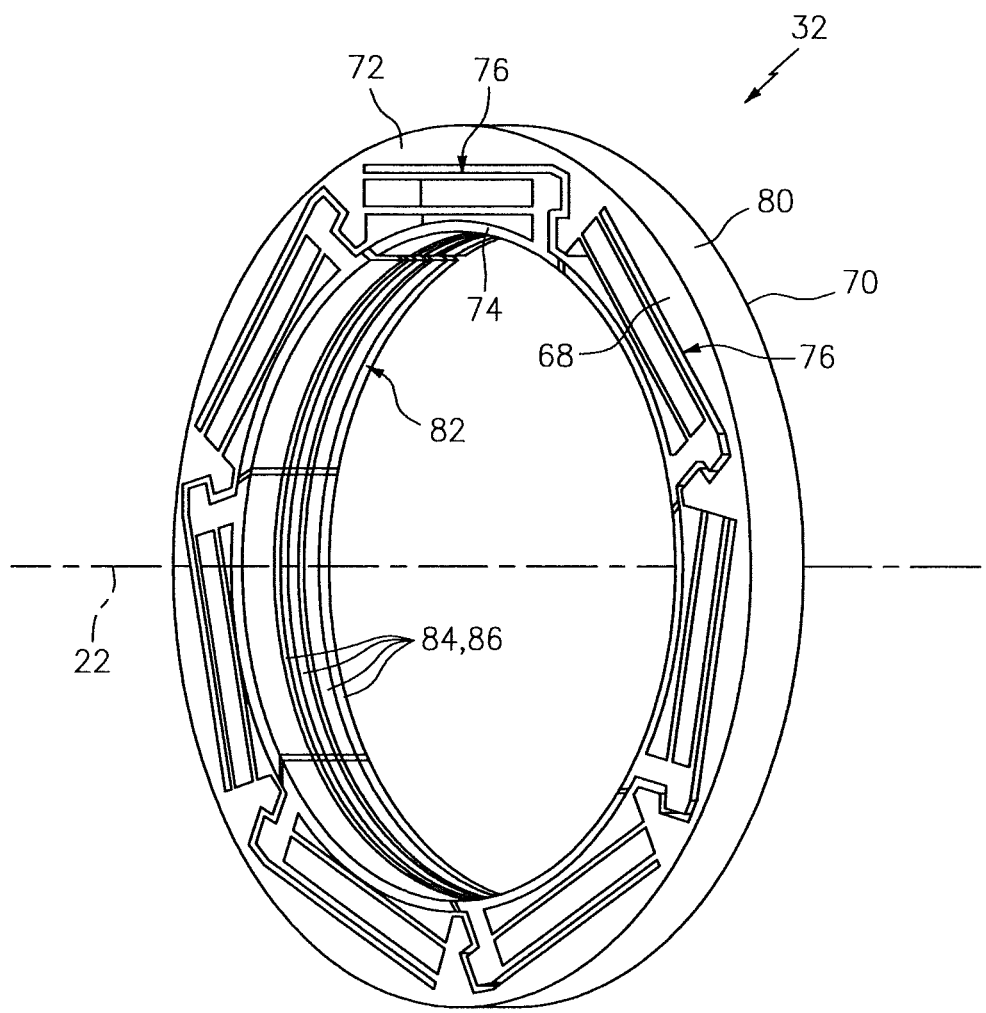
FIG. 6 is a perspective general representation of a primary seal device for the assembly of FIG. 1.

Referring to FIG. 6, the primary seal device 32 is configured as an annular non-contact seal device and, more particularly, a hydrostatic non-contact seal device. An example of such a hydrostatic non-contact seal device is a "HALO™" seal; however, the primary seal device 32 of the present disclosure is not limited to the foregoing exemplary hydrostatic non-contact seal device.

Figure 7:
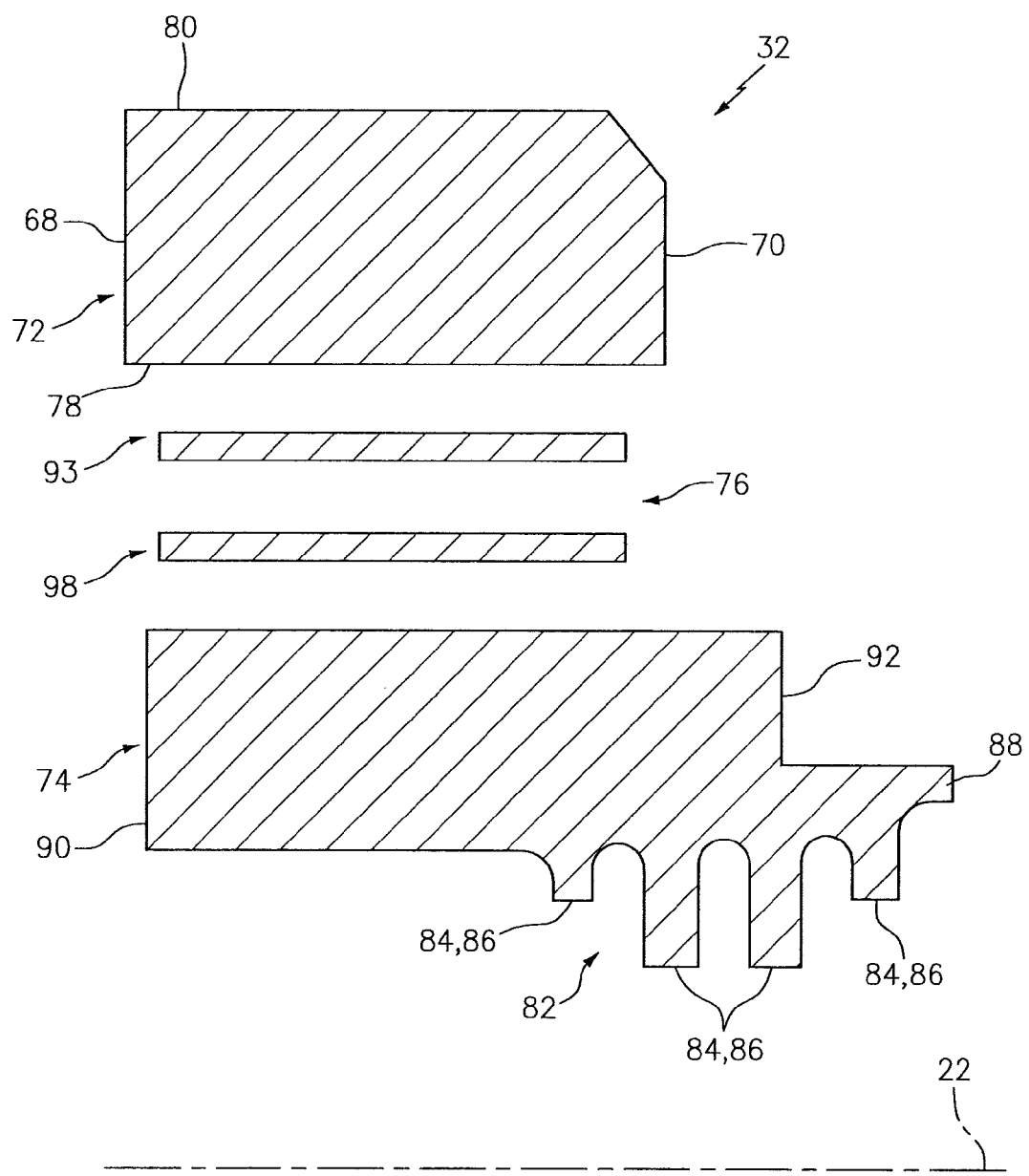
FIG. 7 is a top-half side sectional illustration of a primary seal device.
Figure 8:
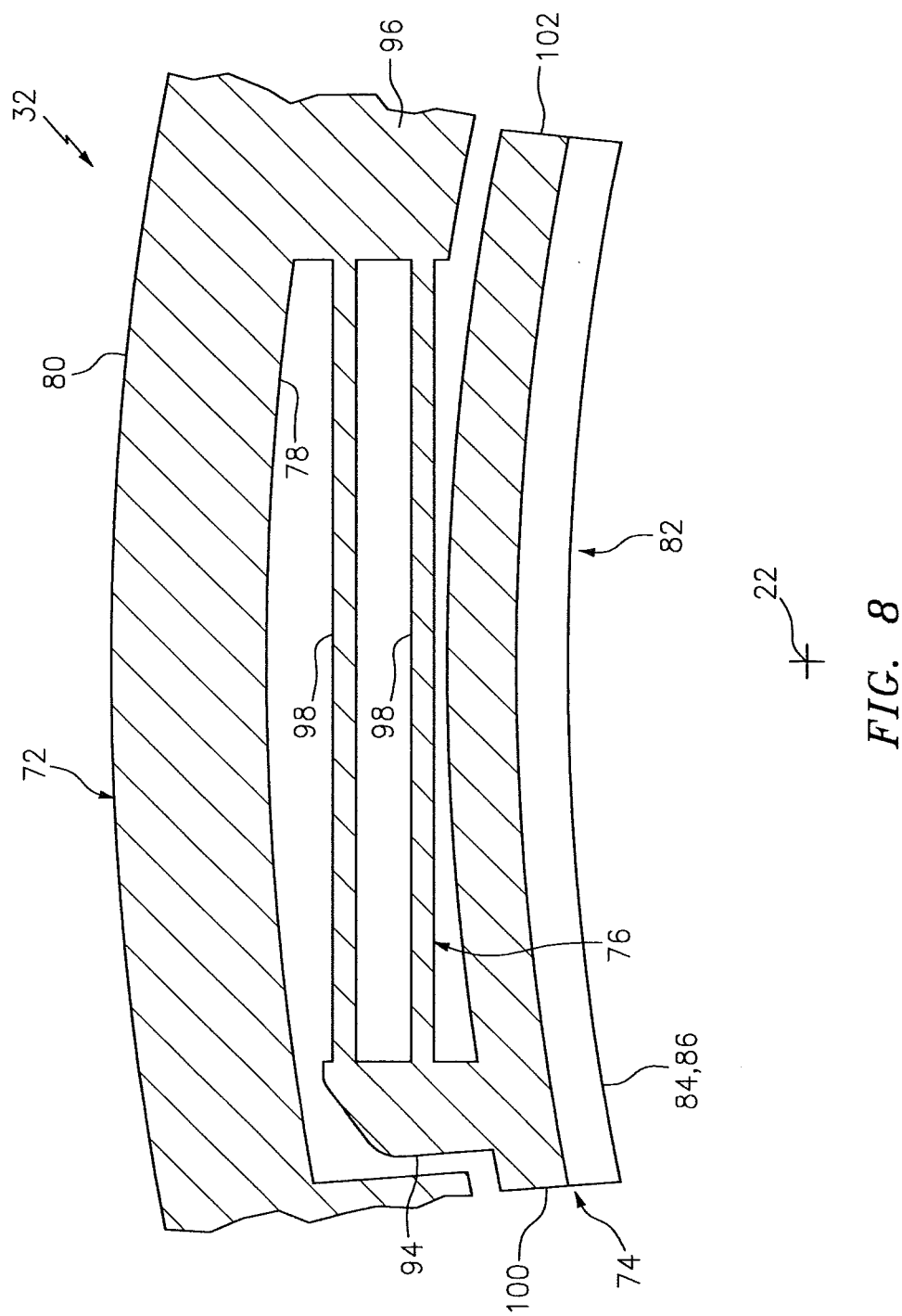
FIG. 8 is a cross-sectional illustration of a portion of the primary seal device of FIG. 7.

Referring to FIGS. 7 and 8, the primary seal device 32 includes a seal base 72, a plurality of seal shoes 74 and a plurality of spring elements 76. The seal base 72 is configured as an annular full hoop body, which extends circumferentially around the axial centerline 22. The seal base 72 is configured to circumscribe the seal shoes 74 as well as the spring elements 76. The seal base 72 extends axially along the axial centerline 22 between and forms the second end surface 68 and the first end surface 70. The seal base 72 extends radially between an inner radial base side 78 and an outer radial base side 80, which radially engages (e.g., is press fit against) the carrier base 46 and, more particularly, the inner surface 54 (see FIG. 1).

Referring to FIGS. 1 and 6, the seal shoes 74 are configured as arcuate bodies arranged circumferentially about the axial centerline 22 in an annular array. This annular array of the seal shoes 74 extends circumferentially around the axial centerline 22, thereby forming an inner bore at an inner radial side 82 of the primary seal device 32. This inner bore is sized to receive the seal land 40 (see FIG. 1), where the rotor structure 26 projects axially through (or into) the inner bore formed by the seal shoes 74.

Referring to FIGS. 1, 6 and 7, each of the seal shoes 74 includes one or more arcuate protrusions 84, which collectively form one or more (e.g., a plurality of axially spaced) generally annular (e.g., circumferentially segmented) ribs 86 at the inner radial side 82. Distal inner radial ends of one or more of these ribs 86 are configured to be arranged in close proximity with (but not touch) and thereby sealingly engage the seal land surface 42 in a non-contact manner, where the rotor structure 26 project axially through (or into) the inner bore formed by the seal shoes 74. The ribs 86 therefore are configured, generally speaking, as non-contact knife edge seal elements.

Referring to FIG. 7, each of the seal shoes 74 extends axially along the axial centerline 22 between a first shoe end 88 and a second shoe end 90. The first shoe end 88 may be axially offset from and project axially away from the first end surface 70. The second shoe end 90 may be axially offset from and recessed axially from the second end surface 68.

Each of the seal shoes 74 includes an arcuate end surface 92 generally at (e.g., on, adjacent or proximate) the first shoe end 88. In the array (see FIG. 6), these arcuate end surfaces 92 collectively form a generally annular (but circumferentially segmented) end surface configured for sealingly engaging with the secondary seal devices 34 (see FIG. 1) as described below in further detail. The seal shoes 74 of the present disclosure, however, are not limited to the foregoing exemplary configuration.

Referring to FIGS. 6 and 7, the spring elements 76 are arranged circumferentially about the axial centerline 22 in an annular array. The spring elements 76 are also arranged radially between the seal shoes 74 and the seal base 72. Each of the spring elements 76 is configured to connect a respective one of the seal shoes 74 with the seal base 72. The spring element 76 shown in FIG. 8, for example, includes one or more mounts 94 and 96 (e.g., generally radial fingers/projections) and one or more springs 98 (e.g., cantilever-leaf springs). The first mount 94 is connected to a respective one of the seal shoes 74 at (e.g., on, adjacent or proximate) its first circumferential side 100, where an opposing second circumferential side 102 of that seal shoe is free floating. The second mount 96 is connected to the seal base 72, and is generally circumferentially aligned with or near the second circumferential side 102. The springs 98 are radially stacked and spaced apart with one another. Each of these springs 98 extends laterally (e.g., tangentially or circumferentially) from the first mount 94 to the second mount 96. These spring elements 76 may thereby laterally overlap a major circumferential portion (e.g., ~50-90%) of the seal shoe 74. The spring elements 76 of the present disclosure, however, are not limited to the foregoing exemplary configuration or values.

During operation of the primary seal device 32, aerodynamic forces may develop and apply a fluid pressure to each of the seal shoes 74 causing the respective seal shoe 74 to move radially relative to the seal land surface 42. The fluid velocity may increase as a gap between the seal shoe 74 and seal land surface 42 increases, thus reducing pressure in the gap and drawing the seal shoe 74 radially inwardly toward the seal land surface 42. As the gap closes, the velocity may decrease and the pressure may increase within the gap, thus, forcing the seal shoe 74 radially outwardly from the seal land surface 42. The respective spring element 76 may deflect and move with the seal shoe 74 to create a primary seal of the gap between the seal land surface 42 and ribs 86 within predetermined design tolerances.

Under certain conditions, one or more of the seal shoes 74 may also move axially relative to the carrier base 46. In particular, a pressure differential across the seal assembly 30 may cause the seal shoes 74 to move axially in a direction (e.g., towards left-hand-side of FIG. 1) towards the support ring 48. To limit this axial movement, the support ring 48 projects radially inwards to radially overlap the seal shoes 74 and is also located axially near the seal shoes 74. In this manner, when one or more of the seal shoes 74 move axially, the shoe(s) 74 axially engage the support ring 48 and prevent further axial displacement of the shoe(s) 74. However, where the seal shoes 74 are in their nominal position (see FIG. 1), a slight axial gap 104 extends between and separates the seal shoes 74 from the support ring 48.

While the primary seal device 32 is operable to generally seal the annular gap between the static structure 24/carrier structure 44 and the rotor structure 26 as described above, fluid (e.g., gas) may still flow axially through passages 106 defined by radial gaps between the components 72, 74 and 76 (see FIG. 1). The secondary seal devices 34 therefore are provided to seal off these passages 106 and, thereby, further and more completely seal the annular gap.

Each of the secondary seal devices 34 may be configured as a ring seal element such as, but not limited to, a split ring. Alternatively, one or more of the secondary seal devices 34 may be configured as a full hoop body ring, an annular brush seal or any other suitable ring-type seal.

The secondary seal devices 34 of FIG. 1 are arranged together in an axial stack. In this stack, each of the secondary seal devices 34 axially engages (e.g., contacts) another adjacent one of the secondary seal devices 34. The stack of the secondary seal devices 34 is arranged with the secondary support structure 66, which positions and mounts the secondary seal devices 34 with the carrier structure 44 axially adjacent the primary seal device 32. In this arrangement, the stack of the secondary seal devices 34 is operable to axially engage and form a seal between the end surface 92 of the array of the seal shoes 74 and an annular surface 108 of the secondary support structure 66. These surfaces 92 and 108 are axially aligned with one another, which enables the stack of the secondary seal devices 34 to slide radially against, but maintain sealingly engagement with, the end surface 92 as the seal shoes 74 move radially relative to the seal land surface 42 as described above.

The secondary support structure 66 may include a secondary seal carrier ring 110 and a support ring 112 (e.g., retention ring), which are nested radially within and radially engaged with the carrier structure 44. The secondary seal carrier ring 110 is configured with an annular full hoop body, which extends circumferentially around the axial centerline 22. The secondary seal carrier ring 110 includes the annular surface 108, and is disposed axially adjacent and engaged with the seal base 72.

The support ring 112 is configured with an annular full hoop body, which extends circumferentially around the axial centerline 22. The support ring 112 is disposed axially adjacent and engaged with the secondary seal carrier ring 110, thereby capturing the stack of the secondary seal devices 34 within an annular channel formed between the rings 110 and 112. The stack of the secondary seal devices 34, of course, may also or alternatively be attached to one of the rings 110, 112 by, for example, a press fit connection and/or otherwise.

Figure 9:
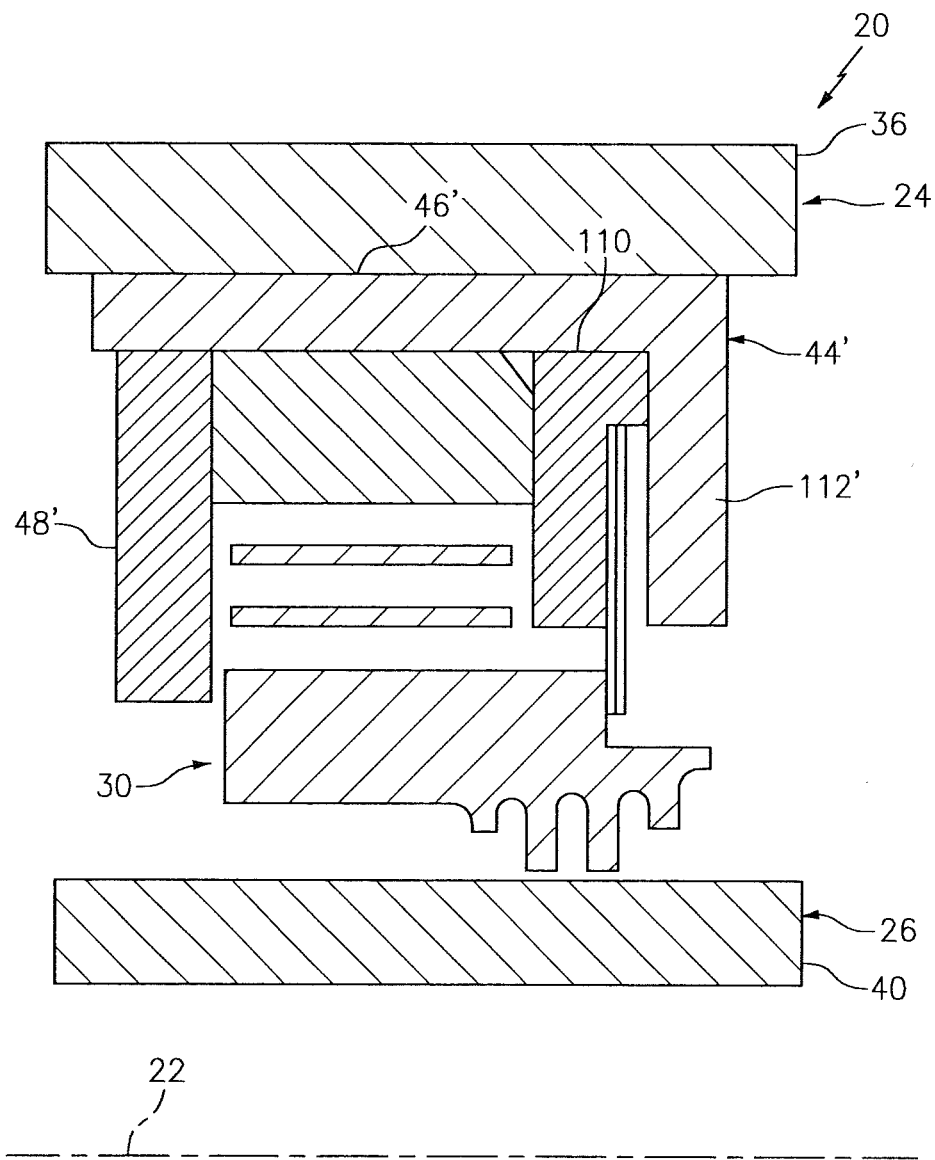
FIG. 9 is a top-half side sectional illustration of another assembly for the rotational equipment.

In alternative embodiments, the relative configuration of the support ring 48 and the support ring 112 may be generally reversed as shown in FIG. 9. For example, the support ring 48' may be configured as a discrete structure from the carrier base 46'. However, the support ring 112' may be configured with the carrier base 46' in a monolithic, unitary carrier structure body.

The present disclosure is not limited to the exemplary primary seal device 32 type or configuration described above. Various other non-contact seals are known in the art and may be reconfigured in light of the disclosure above to be included with the assembly 20 of the present disclosure. Other examples of non-contact seals are disclosed in U.S. Pat. No. 8,172,232; U.S. Pat. No. 8,002,285; U.S. Pat. No. 7,896,352; U.S. Pat. No. 7,410,173; U.S. Pat. No. 7,182,345; and U.S. Pat. No. 6,428,009, each of which is hereby incorporated herein by reference in its entirety.

Figure 10:
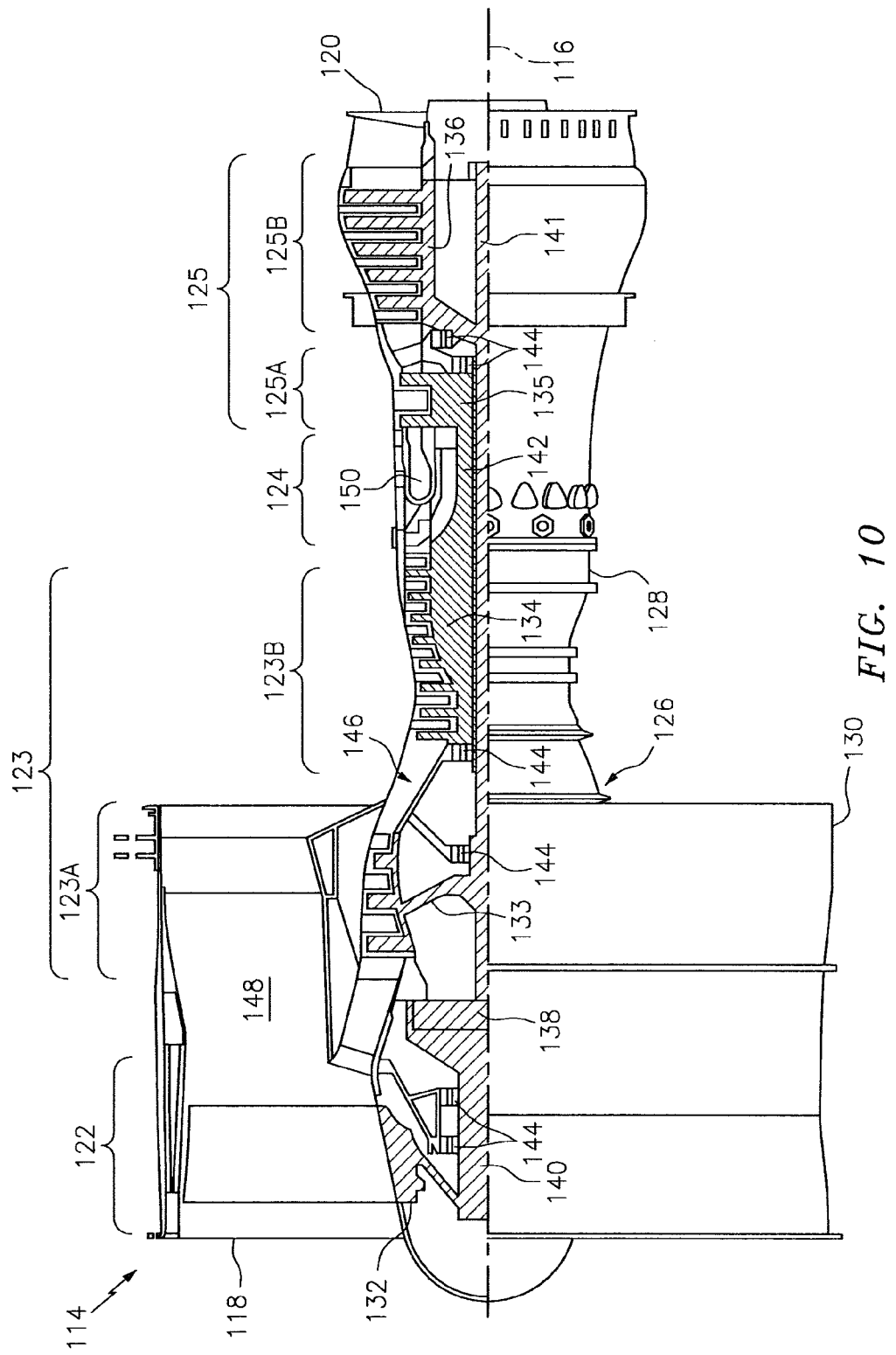
FIG. 10 is a side cutaway illustration of a gas turbine engine.

As described above, the assembly 20 of the present disclosure may be configured with various different types and configurations of rotational equipment. FIG. 10 illustrates one such type and configuration of the rotational equipment—a geared turbofan gas turbine engine 114. Such a turbine engine includes various static structures (e.g., bearing supports, hubs, cases, etc.) as well as various rotor structures (e.g., rotor disks, shafts, etc.) as described below, where the static structure 24 and the rotor structure 26 can respectively be configured as anyone of the foregoing structures in the turbine engine 114 of FIG. 10, or other structures not mentioned herein.

Referring still to FIG. 10, the turbine engine 114 extends along an axial centerline 116 (e.g., the centerline 22) between an upstream airflow inlet 118 and a downstream airflow exhaust 120. The turbine engine 114 includes a fan section 122, a compressor section 123, a combustor section 124 and a turbine section 125. The compressor section 123 includes a low pressure compressor (LPC) section 123A and a high pressure compressor (HPC) section 123B. The turbine section 125 includes a high pressure turbine (HPT) section 125A and a low pressure turbine (LPT) section 125B.

The engine sections 122-125 are arranged sequentially along the centerline 116 within an engine housing 126, a portion or component of which may include or be connected to the static structure 24. This housing 126 includes an inner case 128 (e.g., a core case) and an outer case 130 (e.g., a fan case). The inner case 128 may house one or more of the engine sections 123-125; e.g., an engine core. The outer case 130 may house at least the fan section 122.

Each of the engine sections 122, 123A, 123B, 125A and 125B includes a respective rotor 132-136. Each of these rotors 132-136 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 132 is connected to a gear train 138, for example, through a fan shaft 140. The gear train 138 and the LPC rotor 133 are connected to and driven by the LPT rotor 136 through a low speed shaft 141. The HPC rotor 134 is connected to and driven by the HPT rotor 135 through a high speed shaft 142. The shafts 140-142 are rotatably supported by a plurality of bearings 144; e.g., rolling element and/or thrust bearings. Each of these bearings 144 is connected to the engine housing 126 by at least one stationary structure such as, for example, an annular support strut.

During operation, air enters the turbine engine 114 through the airflow inlet 118. This air is directed through the fan section 122 and into a core gas path 146 and a bypass gas path 148. The core gas path 146 flows sequentially through the engine sections 123A, 123B, 124, 125A and 125B. The bypass gas path 148 flows away from the fan section 122 through a bypass duct, which circumscribes and bypasses the engine core. The air within the core gas path 146 may be referred to as "core air". The air within the bypass gas path 148 may be referred to as "bypass air".

The core air is compressed by the compressor rotors 133 and 134 and directed into a combustion chamber 150 of a combustor in the combustor section 124. Fuel is injected into the combustion chamber 150 and mixed with the compressed core air to provide a fuel-air mixture. This fuel air mixture is ignited and combustion products thereof flow through and sequentially cause the turbine rotors 135 and 136 to rotate. The rotation of the turbine rotors 135 and 136 respectively drive rotation of the compressor rotors 134 and 133 and, thus, compression of the air received from a core airflow inlet. The rotation of the turbine rotor 136 also drives rotation of the fan rotor 132, which propels bypass air through and out of the bypass gas path 148. The propulsion of the bypass air may account for a majority of thrust generated by the turbine engine 114, e.g., more than seventy-five percent (75%) of engine thrust. The turbine engine 114 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 10), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for rotational equipment with an axial centerline, the assembly comprising:
    a monolithic carrier structure including a carrier base and a support ring, the carrier base extending axially along the centerline, and the support ring projecting radially inward from the carrier base;
    a seal assembly nested radially within the carrier base and axially next to the support ring, the seal assembly including a seal base, a plurality of spring elements and a plurality of seal shoes arranged about the centerline in an annular array, the seal base circumscribing the annular array of the seal shoes, and each of the spring elements radially between and connecting a respective one of the seal shoes with the seal base;
    a secondary seal carrier ring nested radially within the carrier base; and
    at least one secondary seal device configured with the secondary seal carrier ring;
    the secondary seal device configured to substantially seal an annular gap between the secondary seal carrier ring and the annular array of the seal shoes; and
    the secondary seal carrier ring engaged axially with the seal base and the support ring, and the secondary seal carrier ring axially between the seal base and the support ring.

2. The assembly of claim 1, wherein the seal base radially engages the carrier base and axially engages the support ring.

3. The assembly of claim 1, wherein the support ring radially overlaps and is configured to provide an axial support for the spring elements.

4. The assembly of claim 1, wherein the assembly is configured such that
    a gap extends axially between the support ring and a first of the spring elements during a first mode; and
    the first of the spring elements axially engages the support ring during a second mode.

5. The assembly of claim 1, wherein the support ring comprises a scalloped support ring.

6. The assembly of claim 1, wherein the support ring is configured with a plurality of apertures arranged about the centerline in an annular array, and each of the apertures extends, in a radial outward direction, partially into the support ring.

7. The assembly of claim 1, further comprising:
    a static structure; and
    a rotor structure;
    wherein the seal assembly is configured to substantially seal an annular gap between the static structure and the rotor structure;
    wherein the seal shoes circumscribe and sealingly engage the rotor structure; and
    wherein the carrier structure is mounted to and radially within the static structure.

8. The assembly of claim 1, wherein the seal assembly comprises a hydrostatic non-contact seal device which includes the seal base, the spring elements and the seal shoes.

9. The assembly of claim 8, wherein the static structure comprises a turbine engine static structure, and the rotor structure comprises a turbine engine shaft.

10. The assembly of claim 1, wherein the rotational equipment comprises a gas turbine engine for an aircraft propulsion system.

11. An assembly for a gas turbine engine with an axial centerline, the assembly comprising:
    a turbine engine static structure;
    a turbine engine rotor structure;
    a carrier structure including a tubular carrier base and an annular support ring which is formed integral with the carrier base as a unitary body, the carrier base mounted to and radially within the static structure;
    a seal assembly nested radially within the carrier base and axially next to the support ring, the seal assembly configured to substantially seal an annular gap between the static structure and the rotor structure, and the seal assembly including a seal base, a plurality of spring elements and a plurality of seal shoes arranged about the centerline in an annular array;
    wherein the seal shoes circumscribe and sealingly engage the rotor structure, wherein the seal base circumscribes the annular array of the seal shoes and radially contacts the carrier base, and wherein each of the spring elements is radially between and connect a respective one of the seal shoes with the seal base;
    a secondary seal carrier ring nested radially within the carrier base; and
    at least one secondary seal device mated with and radially within the secondary seal carrier ring;
    wherein the secondary seal device is configured to substantially seal an annular gap between the secondary seal carrier ring and the annular array of the seal shoes; and
    wherein the secondary seal carrier ring axially contacts the seal base and the support ring, and the secondary seal carrier ring is located axially between the seal base and the support ring.

12. The assembly of claim 11, wherein the assembly is configured such that
    a gap extends axially between the support ring and a first of the spring elements during a first mode; and
    the first of the spring elements axially engages the support ring during a second mode.

13. The assembly of claim 11, wherein the support ring comprises a scalloped support ring.

\* \* \* \* \*